United States Patent [19]

Hubbell

[11] Patent Number: 5,082,087

[45] Date of Patent: Jan. 21, 1992

[54] SHOPPING CART PLACEMENT STRUCTURE WITH STAIRWAY

[76] Inventor: Jackie Hubbell, 1907 Lawrence, Bentonville, Ark. 72712

[21] Appl. No.: 653,136

[22] Filed: Feb. 11, 1991

[51] Int. Cl.⁵ .......................... E04G 27/00; E06C 5/32
[52] U.S. Cl. ..................................... 182/129; 182/77; 182/230; 182/20; 52/186
[58] Field of Search ................ 182/20, 129, 230, 127, 182/77, 113, 35; 52/186

[56] References Cited

U.S. PATENT DOCUMENTS

| | | | |
|---|---|---|---|
| 4,139,077 | 2/1979 | Pena | 182/35 |
| 4,359,793 | 11/1982 | Hosono | 182/35 |
| 4,679,657 | 7/1987 | Bennett | 182/113 |

Primary Examiner—Reinaldo P. Machado
Attorney, Agent, or Firm—Robert R. Keegan

[57] ABSTRACT

There is disclosed a shopping cart placement structure with means for children to ascend the stairway and seat themselves in the child seat of a shopping cart, such structure including a base to rest on the floor, a three sided generally rectangular upright enclosure having one open side for admitting a conventional shopping cart, and a stairway of five steps ascending one side of the enclosure leading to the position of a child's seat in a shopping cart. The stairway has a rail or wall at the outer side and may be entered or exited only from the bottom; a gate at the bottom of the stairway with a spring is self closing; a latch is connected to a cart sensing mechanism so the gate cannot be opened in absence of a shopping cart. Guide tracks at the base of the structure are spaced apart by the normal distance between front wheels of a shopping cart, and a detection mechanism for the shopping cart including a hook is pivotally arranged to engage the front frame of a shopping cart; a remote release means for the hook is operable from a position near the opening to the enclosure.

17 Claims, 4 Drawing Sheets

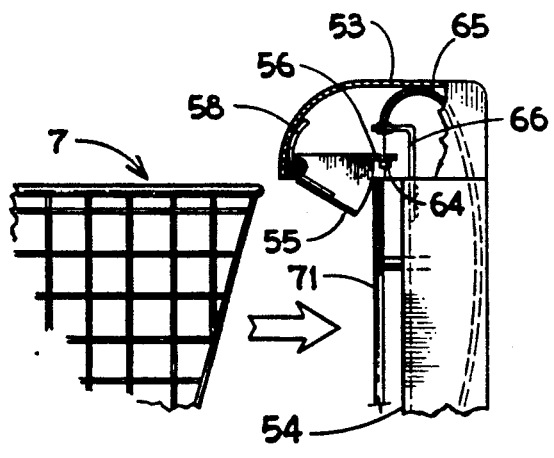
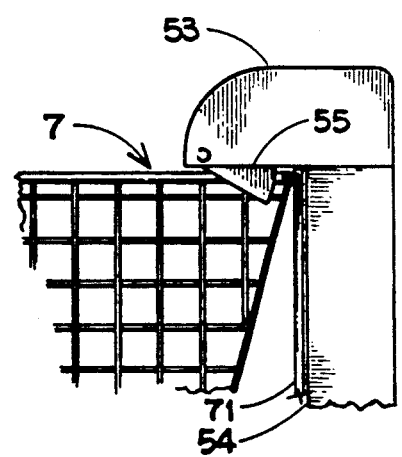
Fig. 3　　　　　　　　Fig. 3A
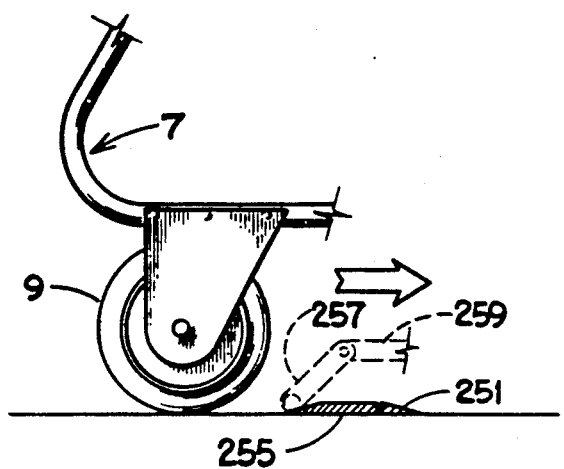
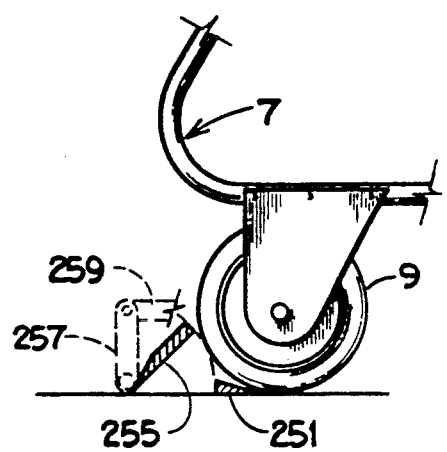
Fig. 4　　　　　　　　Fig. 4A

SHOPPING CART PLACEMENT STRUCTURE WITH STAIRWAY

The present invention relates to a structure in which a conventional shopping cart can be firmly placed and which includes stair means so that a small child can safely climb to a position adjacent the child's seat in a shopping cart and seat itself with little or no assistance from an accompanying adult.

While it is convenient to have children up to at least kindergarten age ride in the shopping cart seat, children about age three or over are too heavy to be easily lifted and placed in the shopping cart seat by the accompanying adult in many cases. This is particularly true if the accompanying adult is a grandparent, in which case lifting a child is at best an inconvenience, and at worst a source of injury to the adult or the child. The alternative of permitting the child to climb into the shopping cart seat is even more dangerous since shopping carts are not intended to be so used and are likely to overturn on top of the child. While a short conventional step ladder might be used to assist the child to climb into the shopping cart seat, this also is not a satisfactory solution because of the several possibilities for accidents that would exist in such a procedure.

The present invention provides a structure having features particularly adapted to overcome the problems mentioned above, and to provide a maximally safe arrangement for a child to ascend a stairway and seat itself in a shopping cart seat with little or no possibility of accident or injury.

The stairway is preferably provided with rails or walls so that it can only be entered or exited at the bottom, and it may also be provided with carpeting or other cushioning for additional safety. The bottom of the stair has a gate or door, preferably self-closing, to limit access to the stairway. A latch for the gate is provided with an interlocking mechanism to prevent the gate from being opened when there is no shopping cart in the structure. A remote release accessible to the accompanying adult may be provided to unlock the gate latch in addition to or instead of the cart sensor apparatus.

Another feature of the structure is a detention mechanism for the cart so that it will not be unstable while the child is seating itself in the child's seat. The detention mechanism may take the form of a pivotally mounted hook engaging the front lower or upper portion of the cart, or it may engage some other portion of the cart such as the back wheels or the front wheels. In any case, the cart detention mechanism may be released by the accompanying adult from a position near the shopping cart handle and the child's seat. If there is a bar or lintel across the top of the opening through which the shopping cart enters and leaves the structure then the bar will be located well above the cart and above the child's head as the cart is removed from or replaced in the structure.

Although the apparatus is functional without a solid enclosure around the cart position, such enclosing wall structure provides a convenient and desirable location for decorative material, advertising material, or both. The apparatus may be implemented with simple mechanical devices, but it may also be implemented with electrical switches, solenoids, and the like and may be provided with indicator lights that may also serve as an inducement for children to use the structure.

In addition to providing the above features and advantages, it is an object of the present invention to provide a shopping cart placement structure with a stairway so that small children of walking age may ascend to a place in the child's seat of a shopping cart with little or no assistance from an accompanying adult, and wherein the stairway is relatively narrow and parallel with the side of the structure whereby the entire structure with stairway occupies less than twice the area of one shopping cart alone.

It is another object of the present invention to provide a shopping cart placement structure with stairway having a self-closing gate limiting access to the stairway and a latch mechanism to prevent opening the gate when there is no shopping cart positioned to receive the child.

It is still another object of the present invention to provide a shopping cart holding structure associated with a child's stairway wherein the structure has detention means for the shopping cart preventing it from being displaced while a child is seating itself in the child's seat.

It is a further object of the present invention to provide a shopping cart placement structure with stairway having a releasable detention mechanism for the shopping cart comprising a hook which engages the lower front frame of the shopping cart when the cart is properly placed in the structure.

Other objects and advantages of the present invention will be apparent from consideration of the following description in conjunction with the appended drawings in which:

FIGS. 3 and 3A are fragmentary enlarged elevational detail views showing operation of the shopping cart detention means of FIGS. 1 and 2;

FIGS. 4 and 4A are fragmentary enlarged detail views showing operation of an alternative form of shopping cart detention means;

Figure 1:
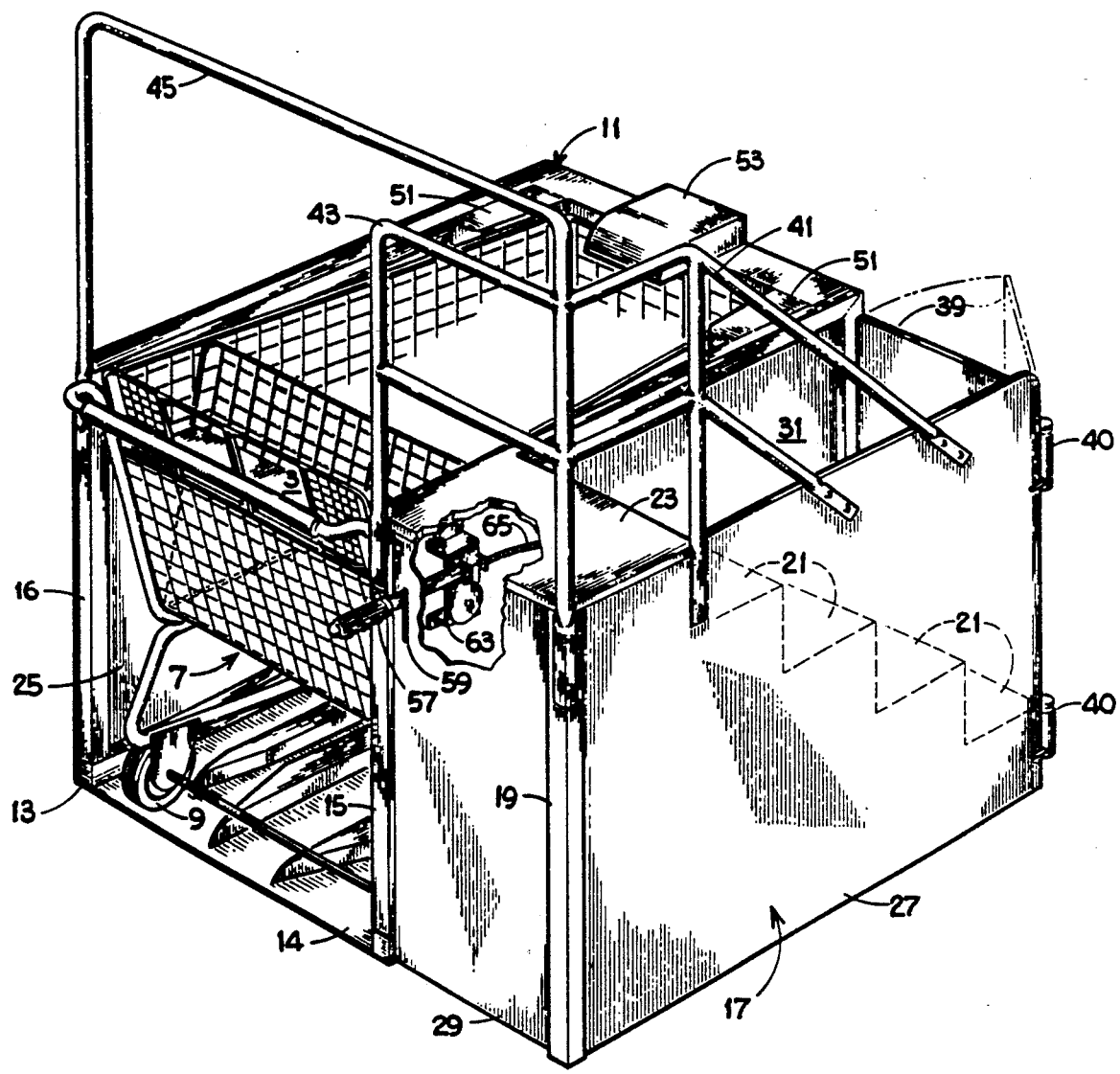
FIG. 1 is a right rear perspective view of a shopping cart placement structure according to the invention.
Figure 2:
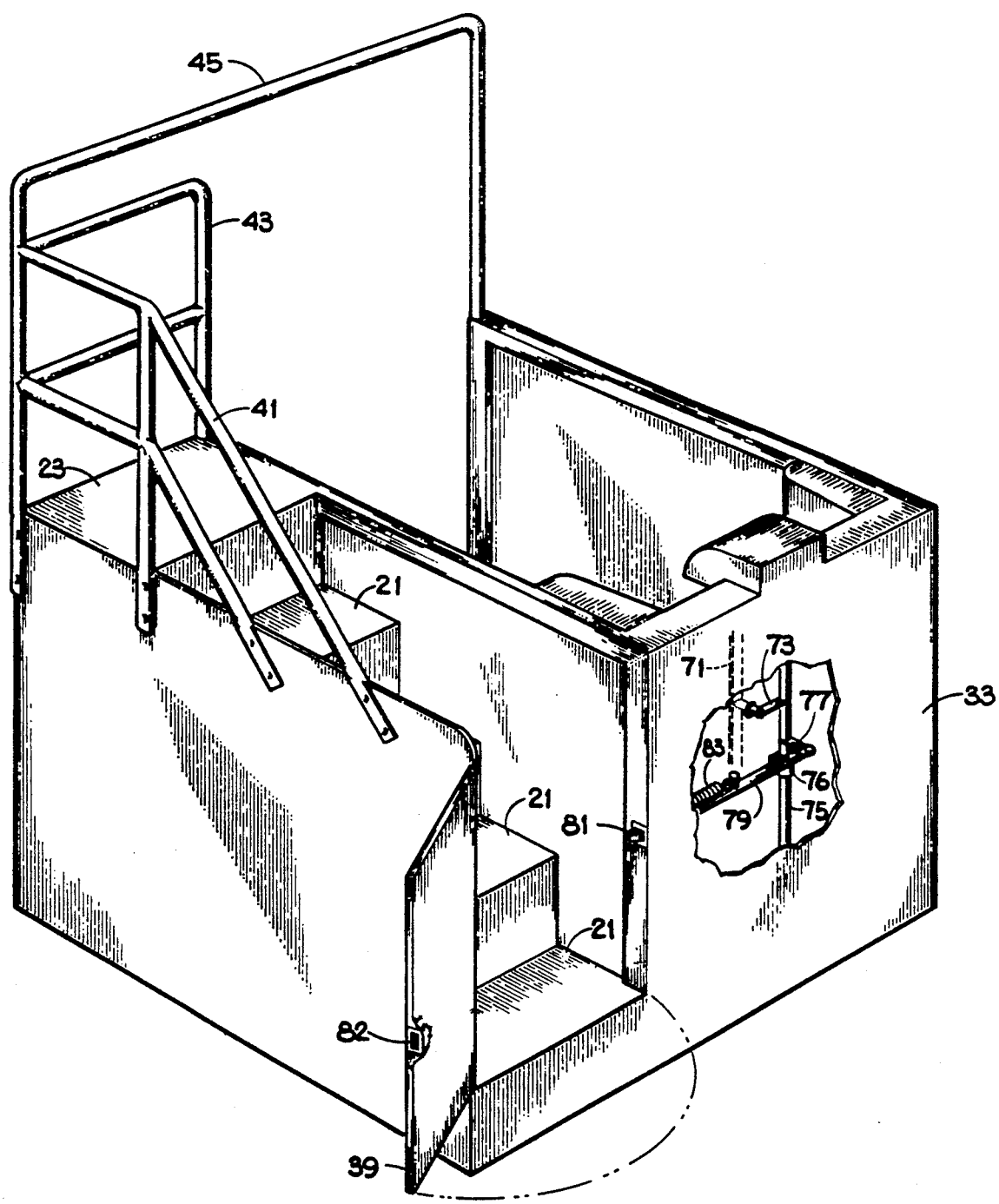
FIG. 2 is a left front perspective view thereof.

Referring now to the drawings, and particularly FIGS. 1 and 2, a shopping cart placement structure 11 is shown having a base 13 of generally rectangular form and of appropriate dimensions to accept a shopping cart 7 for which the structure 11 is intended. Base 13 is optionally provided with a floor 14. On one side, in this case the right side, an upstanding frame 15 has secured thereto a stairway 17 with supports 19, steps 21, and a platform 23 serving as a top step.

A frame 16 is also provided on the left side of base 13 and has secured thereto a panel 25. A similar panel 27 is secured on the outside of steps 21 and stairway support 19. A panel 29 is secured to cover the rear of the stairway 17 and a panel 31 separates stair 17 from the area enclosed by base 13. A panel 33 covers the front of the cart enclosure portion of the structure and a self-closing door 39 secured with spring loaded hinges 40 closes the opening at the bottom of the stairway 17. Rails 41 and 43 prevent the child from falling from steps 21 or platform 23, and rail 43 will serve as a hand hold while the child is seating itself in the child's seat 3 of the shopping cart 7. A lintel or cross bar 45 may be provided extending over the shopping cart position and will be located high enough to avoid any possible contact with the child's head while the cart is being inserted into or removed from the placement structure.

It should be noted that the nature and location of the steps 21 of stairway 17 is a preferred embodiment shown by way of illustration but many variations thereof are possible and may be desirable in some circumstances. The arrangement illustrated in FIG. 1 is most convenient if the structure is located away from any walls or other structures or if it is located with one side or the other against a wall. Another variation wherein steps 21 make a right angle turn and gate 39 is located in the end of panel 27 in FIG. 1 is also workable and would allow the structure to be placed in a corner with only the two nearest sides as shown in FIG. 1 accessible.

It should also be understood that the term "stairway" as used herein includes any other equivalent, such as a ladder or the like, and that a ladder could be secured in the position of panel 29 in FIG. 1 so that the child would approach the platform 23 from the same direction as the opening for the cart 7. In either of these modifications some obvious rearrangement of components would be desired to carry out the function of the apparatus of FIG. 1.

Top guides 51 in the form of spacers or bumpers aid in guiding the narrower front end of the cart 7 into a centered position in the structure.

It should be noted that panels 25, 27, 29, 31 and 33 are in part provided for aesthetic reasons and may be decorated with graphics and or advertising material. If desired, some of such panels may be replaced with a mesh or other partially transparent material, or, in the case of panel 25 for example, may be eliminated.

As previously mentioned, it is desirable for cart 7 to be secured in position while the child is positioning itself in the child's seat so that it does not roll away and cause the child to fall. A cart detention unit 53 is mounted at the front center position for cart 7 at the top of panel 33. As shown in FIGS. 3 and 3A detention unit 53 extends inwardly and has a pivotally mounted foot 55 which is raised by the entry of the front of shopping cart 7 and drops by gravity or by urging of a spring 58 into the shopping cart sufficiently to prevent it from being accidentally displaced in a rearward direction. Upright 54 secured to base 13 and frame 15 serves as a stop for forward motion of cart 7.

As seen in FIG. 1 a handle 57 extending through opening 59 in panel 29 is provided for retraction of foot 55 to permit removal of shopping cart 7. Handle 57 is mounted to frame 15 by bracket 63 and has a sheathed cable 65 (or bowden wire) connection to bracket 66 as seen in FIG. 3. Foot 55 has a tongue 56 with an opening through which the actuator wire of cable 65 passes, and an enlarged end 64 of cable 65 lifts foot 55 when handle 57 is depressed and pulls cable 65. The mechanical arrangement of handle 57 and cable 65 for releasing the cart detention unit 53 is conventional and may be replaced by any other mechanical or electrical means for performing this function.

A cart detector bar 71, as seen in FIG. 2, is movably mounted in a position where it will be depressed by a cart emplaced in the structure 11. Depression of bar 71 causes rotational movement of link 73 rotating rod 75 mounted in bracket 76. A horizontal bar 79 is pin-connected to a link 77 and moves laterally to the right in FIG. 2 when bar 71 is depressed thereby retracting tongue 81 which otherwise cooperates with striker element 82 to latch gate 39. When no cart is present to depress bar 71, tongue 81 is extended by the action of a spring 83.

The mechanism described above causes self-closing gate 39 to be latched by the engagement of tongue 81 with striker element 82 whenever there is no cart 7 within the structure 11, thus discouraging or preventing children from playing on the stairway 17, while allowing convenient opening of gate 39 and use of stairway 17 when a cart is in place in the structure 11. FIG. 3A shows cart 7 in place held by foot 55 and causing bar 71 to be depressed to permit the opening of gate 39 and access to the stairway 17.

An alternative detention mechanism for the cart 7 is shown in FIGS. 4 and 4A. A foot 255 is pivotally mounted on the floor in a position just behind a rear wheel 9 of an emplaced cart 7 as seen in FIG. 4A. A ramp element 251 may be provided to allow cart 7 to be rolled over foot 255 with minimal force.

Foot 255 is coupled to links 257 and 259 which are in turn coupled to sheathed cable 65 with a slack motion coupler (not shown). Preferably foot 255 is spring biased to an upright position as shown in FIG. 4A which bias is overcome by wheel 9 of cart 7 as it rolls into position. Foot 255 thereupon prevents withdrawal of cart 7 as shown in FIG. 4A until it is lowered to the position shown in FIG. 4 by manipulation of handle 57.

Figures 5, 5A:
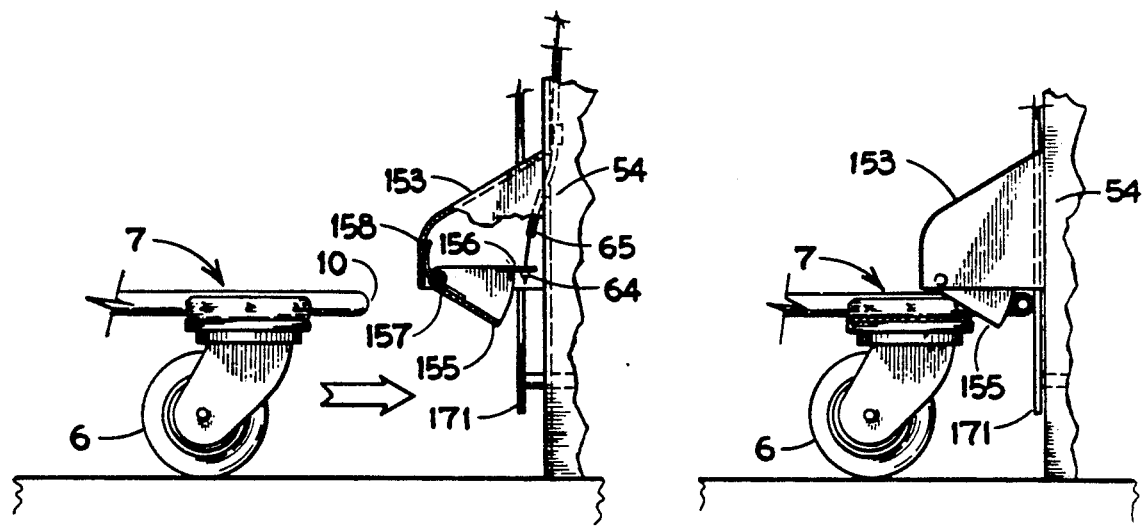
FIGS. 5 and 5A are fragmentary enlarged detail views of a second alternative form of shopping cart detention means and operation thereof.

FIGS. 5 and 5A show another alternative detention mechanism 153 with a foot 155 located to engage the front of the frame 10 which extends forward of the caster-mounted wheels 6. A tongue 156 on foot 155 has a hole through which sheathed cable 65 extends, and the enlarged end 64 of cable 65 serves to engage tongue 156 and lift foot 155 to release cart 7, substantially as described with respect to the detention unit 53 of FIGS. 3 and 3A. Foot 155 is pivotally secured by pin 157 and is urged to a downward position by spring 158. Alternatively, foot 155 may normally be maintained in a downward position by gravity alone and spring 158 may be omitted.

As shown in FIGS. 5 and 5A, cart detector bar 171 is located near floor level and is depressed by frame 10 of cart 7, but the placement of cart detection bar 171 will be determined to operate most effectively with the particular carts which the apparatus is designed to accommodate.

Figure 6:
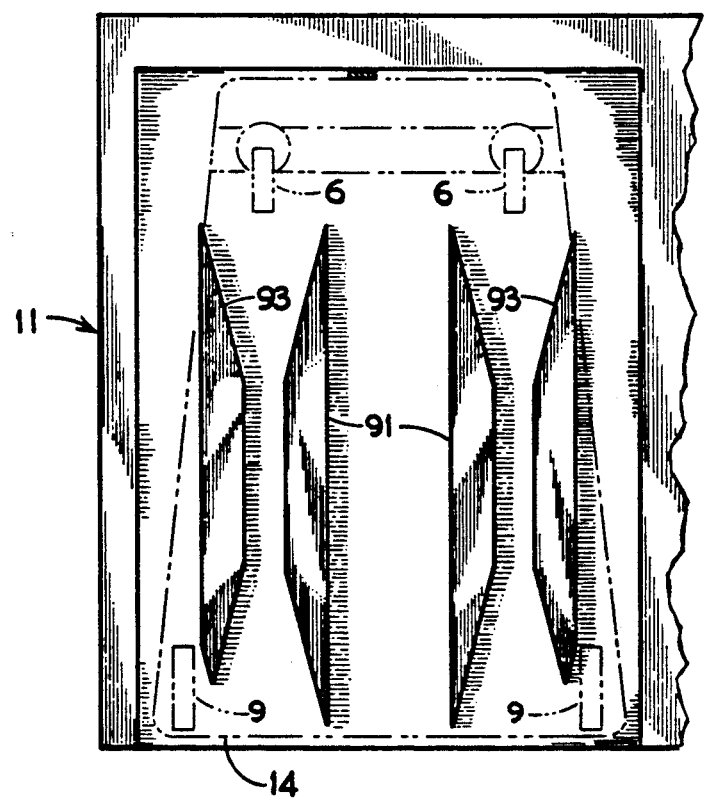
FIG. 6 is a top plan view of a portion of the shopping cart placement structure of FIGS. 1 and 2 showing details of the wheel guide means on the floor thereof.

FIG. 6 shows optional guide tracks 91 and 93 on the floor 14 of the structure 11 which serve to guide the cart 7 and maintain it in alignment in the structure so that it will be properly engaged by detention element 53 and will also properly depress cart detection bar 171 to release gate 39.

Inside tracks 91 are tapered on the outside of both ends to guide front wheels 6 of cart 7 while outside tracks 93 are tapered on the inside and are tapered at the rear on the outside to guide rear wheels 9 of cart 7. The guiding of rear wheels may, in some cases, be unnecessary and outside tracks 93 may be omitted or, in some cases, the tracks 91 and 93 may be omitted entirely.

From the foregoing description and discussion it will be seen that the present invention provides a shopping cart placement structure with a stairway or the like which maximizes the convenience and safety with which a small child can be permitted to ascend into a child's seat in a conventional shopping cart with little or no assistance from an accompanying adult. At the same time, the possibility of improper use of the structure is minimized by safety features incorporated therein.

In addition to the various modifications and variations of the invention which have been shown, described, or suggested, other modifications thereto will be apparent to those of skill in the art, and, accordingly, the scope of the invention is not to be considered limited to those variations described or suggested, but is rather to be determined by reference to the appended claims.

What is claimed is:

1. A shopping cart emplacement structure with child's stairway comprising:
   a generally rectangular base adapted to rest on a level floor, said base having an opening at one end to accept shopping cart wheels,
   an upstanding frame on at least one side of said base,
   at least three steps forming a stairway secured to said frame and leading up to a location above the end of said rectangular base having an opening,
   detention means fixedly secured relative to said base for engaging with said shopping cart and having manually operated release means for disengagement thereof,
   a self-closing gate at the bottom of said stairway preventing ready access thereto,
   a latch for said gate with means for remotely releasing said latch, and
   means preventing release of said latch when said structure is not occupied by a shopping cart.

2. Apparatus as recited in claim 1 wherein said upstanding frame is secured on a long side of said rectangular base and forms a wall from which said steps extend horizontally and outwardly.

3. Apparatus as recited in claim 1 further including a pair of tracks extending into the interior of said rectangular base from said opening spaced apart by a distance substantially equal to the customary spacing between front wheels of a shopping cart.

4. Apparatus as recited in claim 1 wherein said detention means includes a hook member pivotally mounted in a fixed position relative to said base opposite said opening for engaging a horizontal frame member at the forward end of a shopping cart.

5. Apparatus as recited in claim 1 further including an upstanding frame on said base opposite the end of said base having an opening, and wherein said means for preventing release of said latch includes a lever positioned on the last said upstanding frame to be pivoted by the emplacement of a shopping cart within said base and a mechanical linkage from said lever to said means preventing release of said latch.

6. A shopping cart emplacement structure with child's stairway comprising;
   an elongated base adapted to rest on a level floor, said base having an opening at one end to accept shopping cart wheels,
   an upstanding frame secured to said base,
   at least three steps secured relative to said frame and leading up to a location above said base,
   detention means fixedly secured relative to said base for engaging with said shopping cart and having manually operated release means for disengagement thereof, and
   a gate at the bottom of said steps for preventing ready access thereto.

7. Apparatus as recited in claim 6 wherein said at least three steps form a stairway secured to said frame and lead up to a location above the end of said rectangular base having an opening.

8. Apparatus as recited in claim 6 further including a latch for said gate with means for remotely releasing said latch.

9. Apparatus as recited in claim 8 further including means preventing release of said latch when said structure is not occupied by a shopping cart.

10. Apparatus as recited in claim 6 wherein said detention means includes a hook member pivotally mounted in a fixed position relative to said base opposite said opening for engaging a horizontal frame member at the forward end of a shopping cart.

11. Apparatus as recited in claim 6 further including an upstanding frame on said base opposite the end of said base having an opening and wherein said means for preventing release of said latch includes a lever positioned on the last said upstanding frame to be pivoted by the emplacement of a shopping cart within said base and a mechanical linkage from said lever to said means preventing release of said latch.

12. A shopping cart emplacement structure with child's stairway comprising;
   a base adapted to rest on a level floor, said base having an opening to accept shopping cart wheels,
   an upstanding frame secured to said base,
   a plurality of steps secured relative to said frame,
   wheel guide means associated with said base adapted to aid in positioning of a shopping cart adjacent a top one of said steps, and
   detention means fixedly secured relative to said base for engaging with said shopping cart.

13. Apparatus as recited in claim 12 wherein said upstanding frame is secured on a long side of said rectangular base and forms a wall from which said steps extend outwardly.

14. Apparatus as recited in claim 12 wherein said wheel guide means includes a pair of tracks extending into the interior of said rectangular base from said opening spaced apart by a distance substantially equal to the customary spacing between front wheels of a shopping cart.

15. Apparatus as recited in claim 12 wherein said detention means includes a hook member pivotally mounted in a fixed position relative to said base opposite said opening for engaging a horizontal frame member at the forward end of a shopping cart.

16. Apparatus as recited in claim 12 further including a gate secured to said base in front of said steps and provided with a spring connected to urge said gate to a closed position.

17. Apparatus as recited in claim 16 wherein said gate includes a latch and further including a frame member on said base opposite said opening to which is secured means for preventing release of said latch including a lever positioned on said frame member to be pivoted by the emplacement of a shopping cart within said base, and a mechanical linkage from said lever to said means preventing release of said latch.

* * * * *